United States Patent [19]

Hattori et al.

[11] Patent Number: 4,935,323
[45] Date of Patent: Jun. 19, 1990

[54] PHOTOCONDUCTOR FOR ELECTROPHOTOGRAPHY

[75] Inventors: Yoshimasa Hattori; Noboru Furusho, both of Kawasaki, Japan

[73] Assignee: Fuji Electric Co., Ltd., Kanagawa, Japan

[21] Appl. No.: 361,660

[22] Filed: Jun. 2, 1989

[30] Foreign Application Priority Data

| | | | |
|---|---|---|---|
| Jun. 8, 1988 | [JP] | Japan | 63-140874 |
| Jun. 30, 1988 | [JP] | Japan | 63-163018 |
| Jun. 30, 1988 | [JP] | Japan | 63-163020 |
| Jun. 30, 1988 | [JP] | Japan | 63-163021 |
| Mar. 2, 1989 | [JP] | Japan | 64-50771 |

[51] Int. Cl.$^5$ ............................................. G03G 5/14
[52] U.S. Cl. .................................. 430/58; 430/73; 430/75
[58] Field of Search ............... 430/58, 70, 71, 73, 430/75

[56] References Cited

U.S. PATENT DOCUMENTS

| | | | |
|---|---|---|---|
| 3,484,237 | 12/1969 | Shattuck et al. | 96/1.5 |
| 4,150,987 | 6/1979 | Anderson et al. | 260/566 B |
| 4,278,747 | 7/1981 | Murazama et al. | 430/82 |
| 4,353,971 | 1/1982 | Chang et al. | 430/58 |
| 4,367,273 | 1/1983 | Murayama et al. | 430/56 |
| 4,385,106 | 2/1983 | Sakai | 430/59 |
| 4,415,640 | 11/1983 | Goto et al. | 430/59 |
| 4,448,868 | 4/1984 | Suzuki et al. | 430/58 |
| 4,565,761 | 6/1986 | Katagiri et al. | 430/83 |
| 4,568,623 | 2/1986 | Makino et al. | 430/58 |
| 4,606,986 | 8/1986 | Yamuss et al. | 430/59 |
| 4,624,904 | 11/1986 | Kazmaier et al. | 430/59 |
| 4,629,670 | 11/1986 | Katagiri et al. | 430/58 |
| 4,666,809 | 5/1987 | Matsumoto et al. | 430/76 |
| 4,673,630 | 10/1987 | Katagiri et al. | 430/72 |
| 4,677,045 | 6/1987 | Champ et al. | 430/76 |
| 4,702,983 | 10/1987 | Haino et al. | 430/75 |
| 4,731,315 | 3/1988 | Horie et al. | 430/77 |
| 4,783,387 | 11/1988 | Ueda | 430/76 |
| 4,808,503 | 2/1989 | Yamada et al. | 430/75 |
| 4,839,252 | 4/1989 | Murata et al. | 430/59 |
| 4,861,691 | 8/1989 | Kuroda et al. | 430/73 |
| 4,861,692 | 8/1989 | Kuroda et al. | 430/73 |

FOREIGN PATENT DOCUMENTS

| | | |
|---|---|---|
| 0131140 | 1/1985 | European Pat. Off. |
| 03019909 | 11/1980 | Fed. Rep. of Germany |
| 3141306 | 6/1982 | Fed. Rep. of Germany |
| 3139524 | 8/1982 | Fed. Rep. of Germany |
| 3203621 | 9/1982 | Fed. Rep. of Germany |
| 3303830 | 8/1983 | Fed. Rep. of Germany |
| 3320674 | 8/1983 | Fed. Rep. of Germany |
| 10785 | 5/1972 | Japan |
| 37543 | 12/1972 | Japan |
| 66444 | 9/1973 | Japan |
| 39952 | 4/1975 | Japan |
| 50445 | 3/1984 | Japan |
| 59-182456 | 7/1984 | Japan |
| 59-182457 | 12/1984 | Japan |
| 93443 | 5/1985 | Japan |
| 264055 | 11/1987 | Japan |

*Primary Examiner*—John L. Goodrow
*Attorney, Agent, or Firm*—Spencer & Frank

[57] ABSTRACT

A photoconductor for electrophotography comprises a substrate and a photosensitive layer formed on the substrate and including a novel azo compound. The one type of the azo compound is represented by the following general formula.

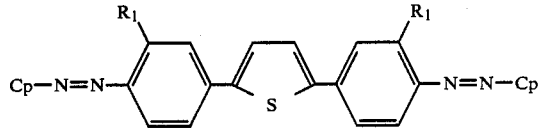

Wherein Cp stand for a coupler residual group and $R_1$ stand for one of a hydrogen atom, a lower alkyl group, a lower alkoxy group and carbamoyl group.

4 Claims, 1 Drawing Sheet

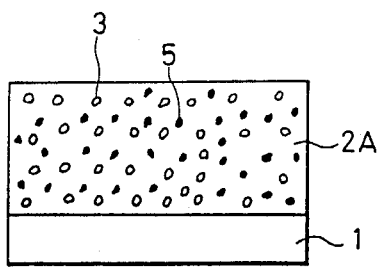
F I G. 1
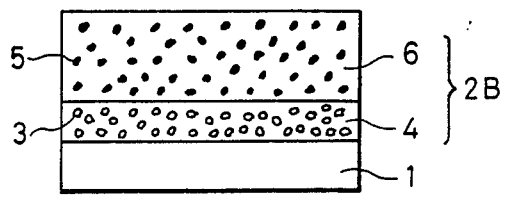
F I G. 2
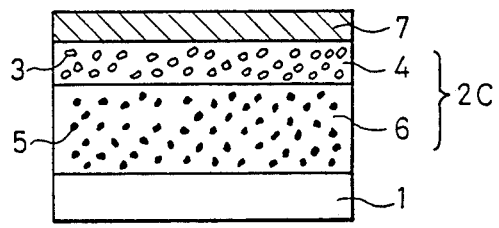
F I G. 3

PHOTOCONDUCTOR FOR ELECTROPHOTOGRAPHY

BACKGROUND OF THE INVENTION

1. Field of the Invention

The present invention relates to photoconductors for electrophotography, and particularly to a photoconductor for electrophotography which contains an azo compound in the photosensitive layer thereof formed on an electroconductive substrate.

2. Description of the Prior Art

Photosensitive materials which have heretofore been used in photoconductors for electrophotography include inorganic photoconductive substances such as selenium and selenium alloys, dispersions of inorganic photoconductive substances such as zinc oxide and cadmium sulfide in resin binders, organic polymeric photoconductive substances such as poly-N-vinylcarbazole and polyvinylanthracene, organic photoconductive substances such as phthalocyanine compounds and disazo compounds, and dispersions of such organic polymeric photoconductive substances in resin binder.

Photoconductors are required to have a function of maintaining a surface electric charge in the dark, a function of generating an electric charge upon receiving light, and a function of transportion an electric charge upon receiving light. They are classified into two types of photoconductors, namely so-called monolayer type photoconductors, and so-called laminate type photoconductors. The former comprises a single layer having all of the above-mentioned three functions, and the latter comprises functionally distinguishable laminated layers, one of which contributes mainly to the generation of electric charge, and another of which contributes to the retention of surface electric charge in the dark and the electric charge transportation upon receiving light. In an electrophotographic method using a photoconductor of the kind as mentioned above, for example, the Carlson's system is applied to image formation. The image formation according to this system comprises steps of subjecting a photoconductor in the dark to corona discharge to charge the photoconductor, illuminating the surface of the charged photoconductor with imagewise light based on a manuscript or copy bearing, e.g., letters and/or pictures to form a latent electrostatic image, developing the formed latent electrostatic image with a toner, and transferring the developed toner image to a support such as a paper sheet to fix the toner image on the support. After the toner image transfer, the photoconductor is subjected to the steps of removal of the electric charge, removal of the remaining toner (cleaning), neutralization of the residual charge with light (erasion), and so on to be ready for reuse.

Photoconductors for electrophotography in which use is made of organic materials have recently been put into practical use by virtue of the advantageous features of flexibility, thermal stability, and/or a film forming capacity. They include a photoconductor comprising poly-N-vinylcarbazole and 2,4,7-trinitrofluoren-9one (disclosed in U.S. Pat. No. 3,484,237), a photoconductor using an organic pigment as a main component (disclosed in Japanes Patent Laid-Open No. 37,543/1972), and a photoconductor using as a main component a eutectic complex composed of a dye and a resin (disclosed in Japanese Patent Laid-Open No. 10,785/1972). A number of novel azo compounds and perylene compounds and the like have also been put into practical use for photoconductors.

Although organic materials have many advantageous features mentioned above with which inorganic materials are not endowed, however, the fact is that there have been obtained no organic materials fully satisfying all the characteristics required of a material to be used in photoconductors for electrophotography at the present. Particular problems involved in organic materials have been concerned with photosensitivity and characteristics in continuous repeated use.

SUMMARY OF THE INVENTION

An object of the present invention, which has been made in view of the foregoing, is to provide a photoconductor for electrophotography for use in copying apparatuses and printers which photoconductor includes a novel organic materials not used to date as a charge generating substance in the photosensitive layer, and has a high photosensitivity and excellent characteristics in repeated use.

In accordance with the present invention, a photoconductor for electrophotography comprises:

a substrate; and a photosensitive layer formed on the substrate and including at least one azo compound represented by the following general formulae (I), (II), (III) and/or (IV) as a charge generating substance:

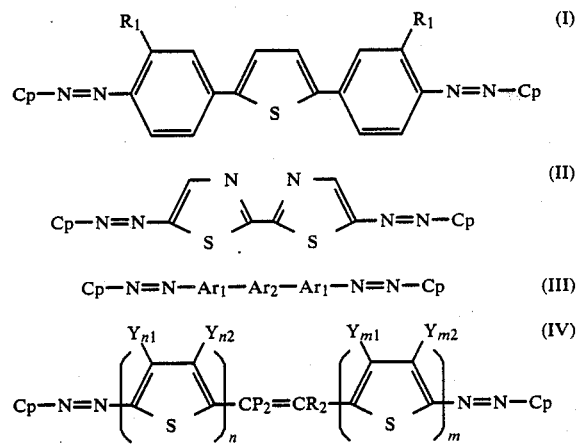

wherein, each of Cp stands for a coupler residual group; in the general formula (I), $R_1$ stands for one o± a hydrogen atom, a lower alkyl group, a lower alkoxy group and carbamoyl group; in the general formula (III), $Ar_1$ stands for one of a thienylene group and a thiazolylene group, each o± which may be or not may be substituted, $Ar_2$ stands for one of a phenylen group and a thienylen group, each of which may be or not may be substituted ($Ar_1$ and $Ar_2$ do not stand for a thienylene group at the same time); in the general formula (IV), $R_2$ stands for one of a hydrogen atom, a lower alkyl group and a phenyl group which may be or not may be substituted, each of $Yn_1$, $Yn_2$, $Ym_1$ and $Ym_2$ stands for one of a hydrogen atom, a lower alkyl group, lower alkoxy group and the following groups, an aromatic hydrocarbon group and aromatic heterocyclic group, both of which may be or not may be substituted and each o± n and m stands for one integer of 1, 2 and 3.

Here, the coupler residual group may have one of the structure represented by the following general formulae (V), (VI), (VII) and (VIII):

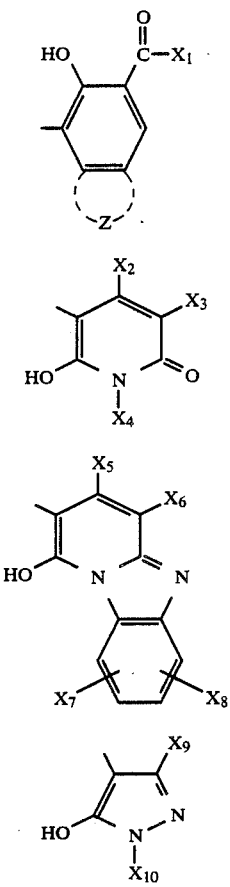

wherein, Z stands for a residual group which forms a polycyclic aromatic ring or an aromatic heterocyclic ring by condensation with a benzene ring; $X_1$ stands for an $OR_3$ or an $NR_4R_5$ (each of $R_3$, $R_4$ and $R_5$ stands for one of a hydrogen atom, an alkyl group, an aryl group and an aromatic heterocyclic group, each of which groups may be or not may be substituted); each of $X_2$ and $X_5$ stands for one of an alkyl group, an aryl group and a aromatic heterocyclic group each of which may be or not may be substituted, each of $X_3$ and $X_6$ stands for one of a hydrogen atom, a cyano group, a carbamoyl group, a carboxyl group, an ester group and an acyl group, $X_4$ stands for one of a hydrogen atom, an alkyl group, a cycloalkyl group, an alkenyl group, an aryl group and an aromatic heterocyclic group, each of which groups may be or not may be substituted, each of $X_7$ and $X_8$ stands for one of a hydrogen atom, a holgen atom, a nitro group and the following groups, an alkyl group and an alkoxy group, both of which may be or not may be substituted, $X_9$ stands for one of an alkyl group, an aryl group, a carboxyl group and an ester group and $X_{10}$ stands for one of an aryl group and an aromatic heterocyclic group, both of which may be or not may be substituted.

The photoconductor may comprise a layer including dispersion of a charge generating substance selected from azo compounds represented by the general formula (I), (II), (III) and/or (IV) and a charge transporting substance.

The photoconductor may comprise a laminate of a charge transporting layer mainly composed of a charge transporting substance and a charge generating layer including a compound selected from azo compounds represented by the general formula (I), (II), (III) and/or (IV).

BRIEF DESCRIPTION OF THE DRAWINGS

FIGS. 1 to 3 are schematic cross-sectional views of photoconductors according to the present invention.

DETAILED DESCRIPTION OF PREFERRED EMBODIMENTS

A photoconductor according to the present invention includes at least one azo compound represented by the following general formula (I), (II), (III) and/or (IV).

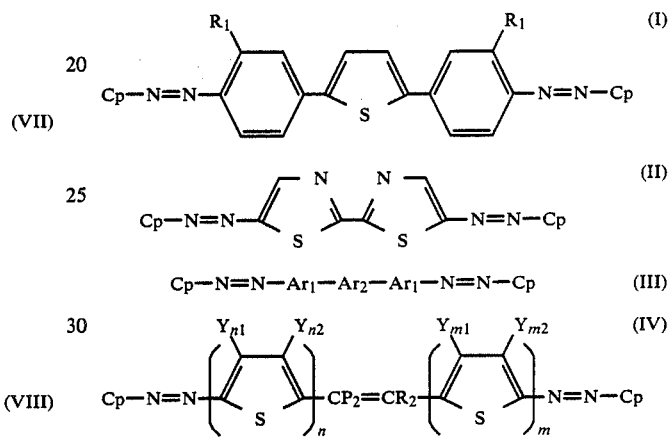

Wherein, each of $C_p$ stands for a coupler residual group; in the general formula (I), $R_1$ stands for one of a hydrogen atom, a lower alkyl group, a lower alkoxy group and carbamoyl group; in the general formula (III), $Ar_1$ stands for one of a thienylene group and a thiazolylene group, each of which may be or not may be substituted, $Ar_2$ stands for one of a phenylen group and a thienylen group, each of which may be or not may be substituted ($Ar_1$ and $Ar_2$ do not stand for a thienylene group at the same time); in the general formula (IV), $R_2$ stands for one of a hydrogen atom, a lower alkyl group and a phenyl group which may be or not may be substituted, each of $Yn_1$, $Yn_2$, $Ym_1$ and $Ym_2$ stands for one of a hydrogen atom, a lower alkyl group, lower alkoxy group and the following groups, an aromatic hydrocarbon group and aromatic heterocyclic group, both of which may be or not may be substituted and each of n and m stands for one integer of 1, 2 and 3.

The coupler residual group $C_p$ in the general formulae (I), (II), (III) and (IV) has preferably one of the structure represented by the following general formulae (V), (VI), (VII) and (VIII).

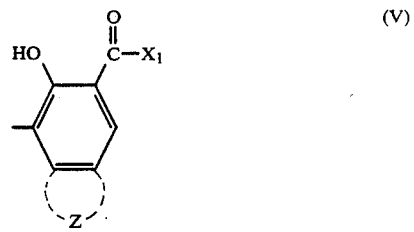

-continued

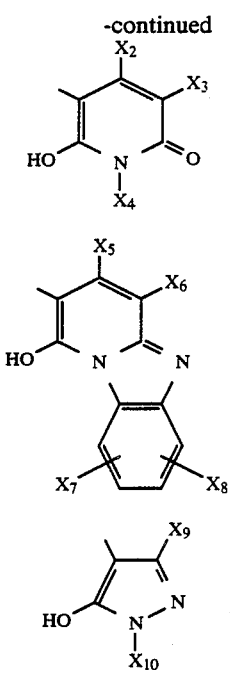

Wherein, Z stands for a residual group which forms a polycyclic aromatic ring or an aromatic heterocyclic ring by condensation with a benzene ring; $X_1$ stands for an $OR_3$ or an $NR_4R_5$ (each of $R_3$, $R_4$ and $R_5$ stands for one of a hydrogen atom, an alkyl group, an aryl group and an aromatic heterocyclic group, each of which groups may be or not may be substituted); each of $X_2$ and $X_5$ stands for one of an alkyl group, an aryl group and a aromatic heterocyclic group each of which may be or not may be substituted, each of $X_3$ and $X_6$ stands for one of a hydrogen atom, a cyano group, a carbamoyl group, a carboxyl group, an ester group and an acyl group, $X_4$ stands for one of a hydrogen atom, an alkyl group, a cycloalkyl group, an alkenyl group, an aryl group and an aromatic heterocyclic group, each of which groups may be or not may be substituted, each of $X_7$ and $X_8$ stands for one of a hydrogen atom, a holgen atom, a nitro group and the following groups, an alkyl group and an alkoxy group, both of which may be or not may be substituted, $X_9$ stands for one of an alkyl group, an aryl group, a carboxyl group and an ester group and $X_{10}$ stands for one of an aryl group and an aromatic heterocyclic group, both of which may be or not may be substituted. The azo compounds represented by the general formula (I), (II), (III) or (IV) can be synthesized by coupling reacting the corresponding diazonium salt with the coupler in an appropriate organic solvent, such as N, N-dimethyl-foramide (DMF), in the presence of a base.

As for the use of the azo compounds represented by the general formulae given above in photosensitive layers, there has been no precedent before. In the course of the intensive study of various organic materials as made in an attempt to achieve the above object, the present inventors conducted a number of experiments with those azo compounds and, as a result, found that the use of such specific azo comounds represented by the above general formulae (I) to (IV) as charge generating substances is very effective in improving electrophotographic characteristics. Based on this finding, photoconductors having high sensitivity and good repeated use characteristics are obtained.

Specific examples of the azo compounds of the general formula (I) prepared in the above-mentioned manner include:

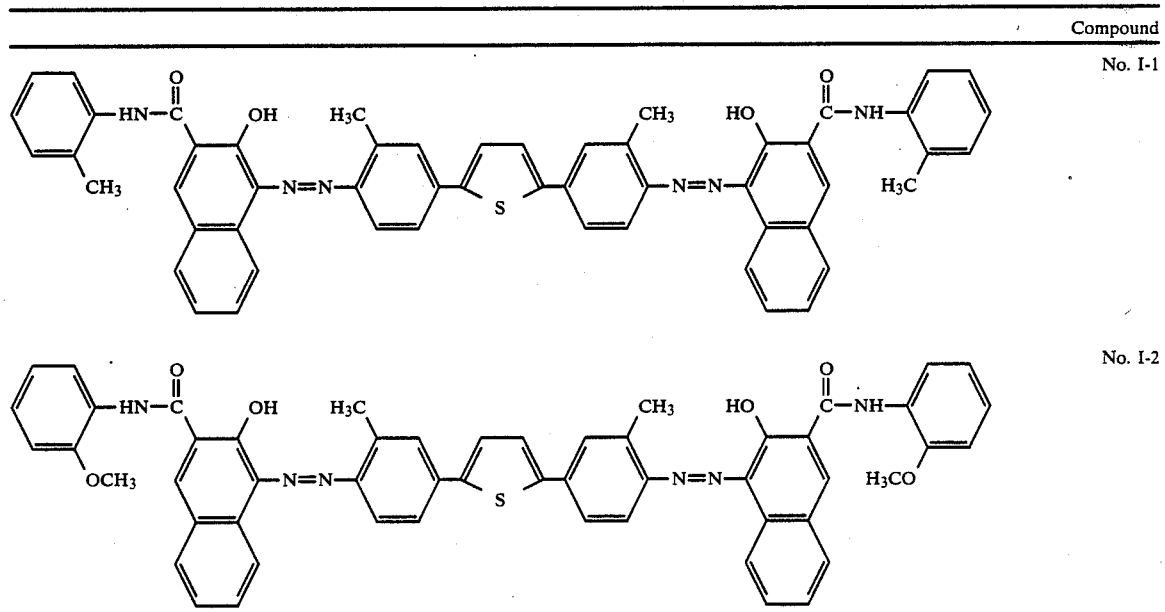

| Compound |
| --- |
| No. I-1 |
| No. I-2 |

-continued

| | Compound |
|---|---|
| | No. I-3 |
| | No. I-4 |
| | No. I-5 |
| | No. I-6 |
| | No. I-7 |

| Compound |
|---|
| No. I-8 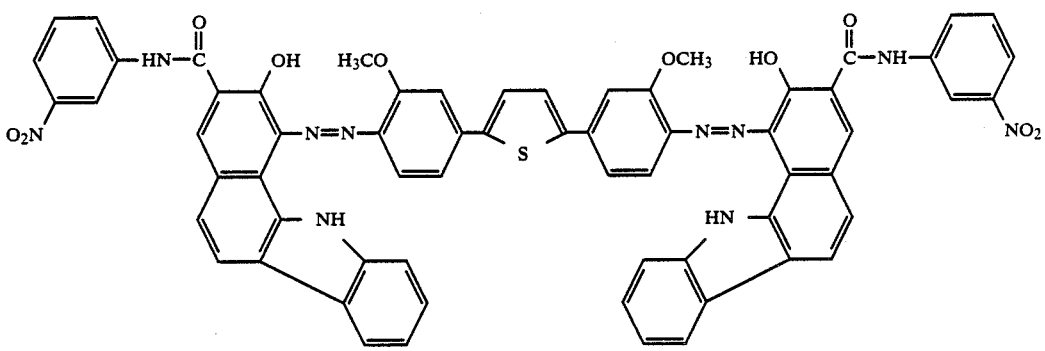 |
| No. I-9 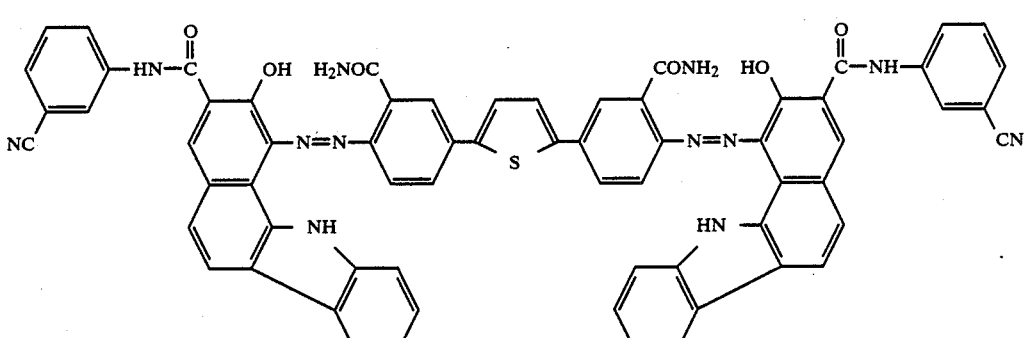 |
| No. I-10 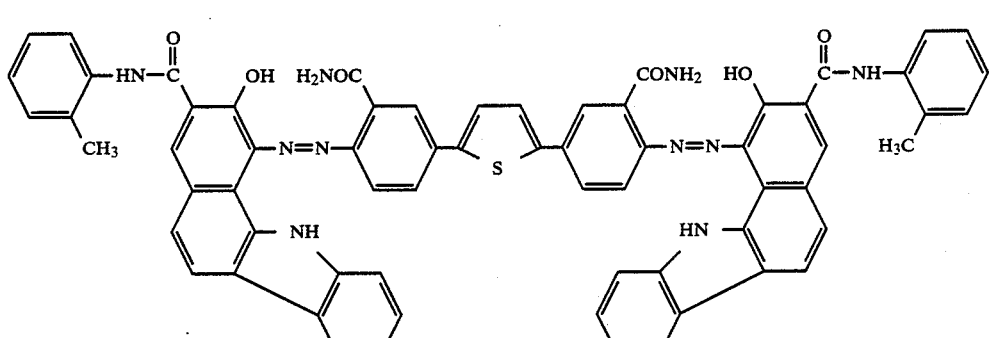 |
| No. I-11 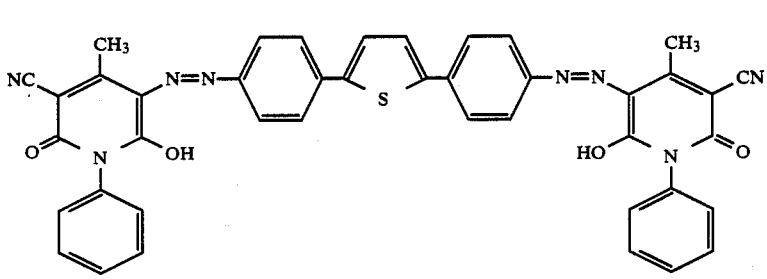 |
| No. I-12 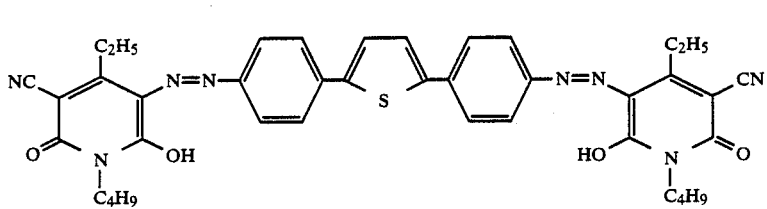 |

-continued

| | Compound |
|---|---|
| (structure) | No. I-13 |
| (structure) | No. I-14 |
| (structure) | No. I-15 |
| (structure) | No. I-16 |
| (structure) | No. I-17 |

-continued
| | Compound |
|---|---|
| 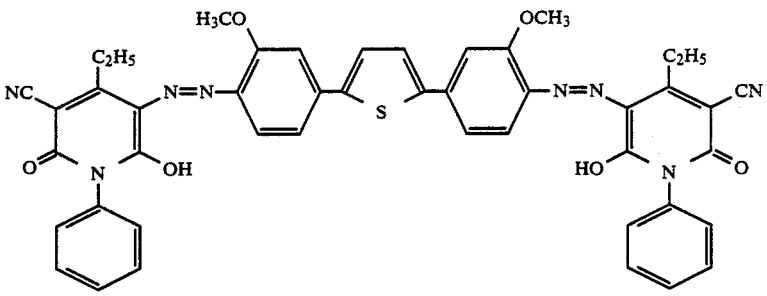 | No. I-18 |
| 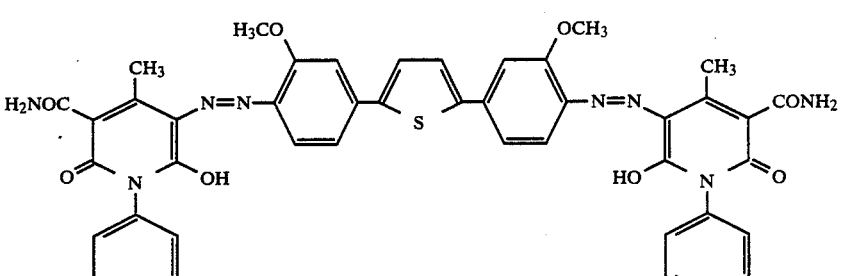 | No. I-19 |
| 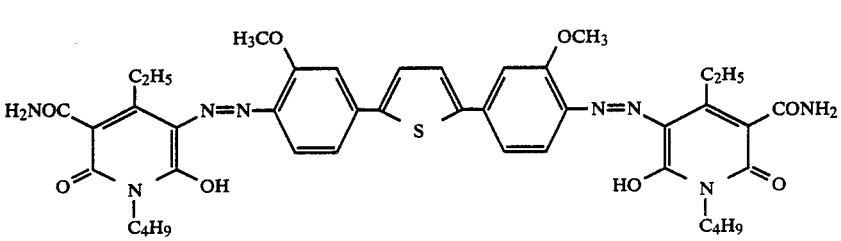 | No. I-20 |
| 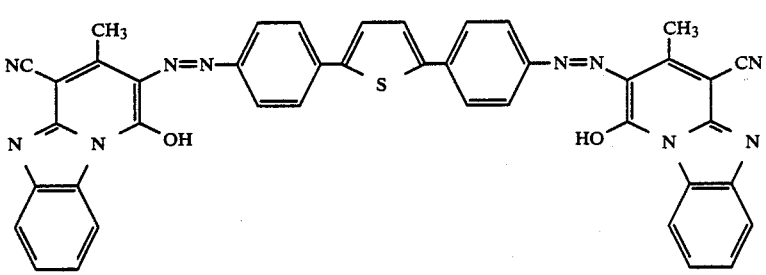 | No. I-21 |
| 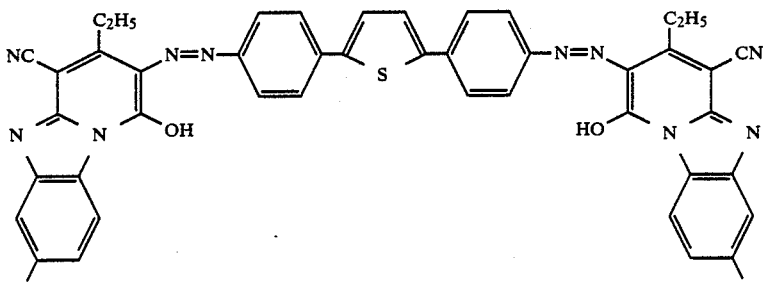 | No. I-22 |

| | Compound |
|---|---|
| 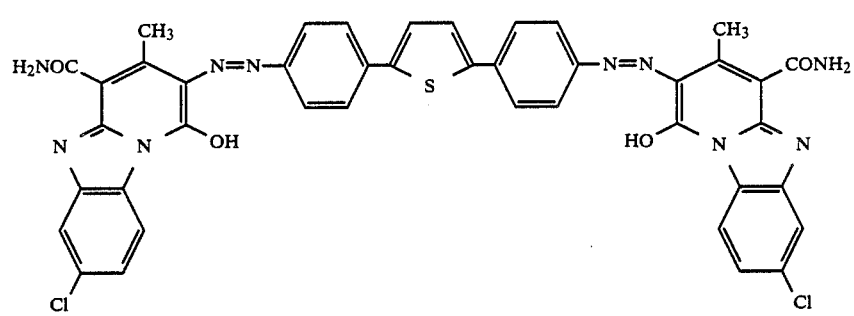 | No. I-23 |
| 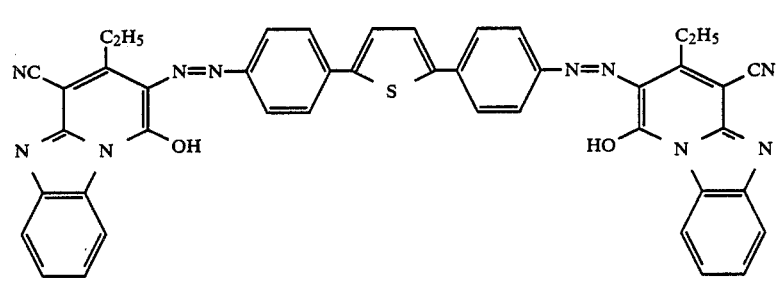 | No. I-24 |
| 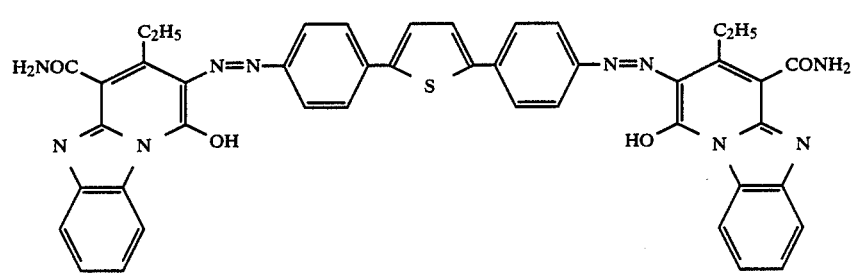 | No. I-25 |
| 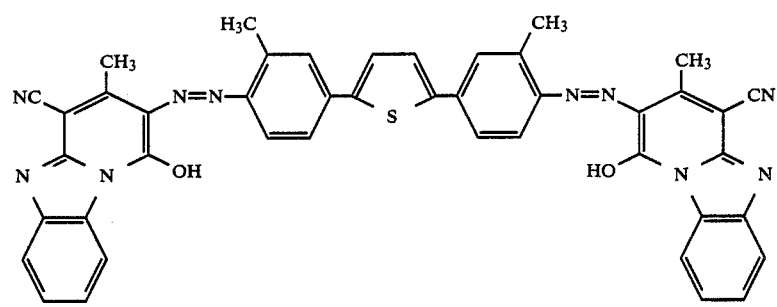 | No. I-26 |
| 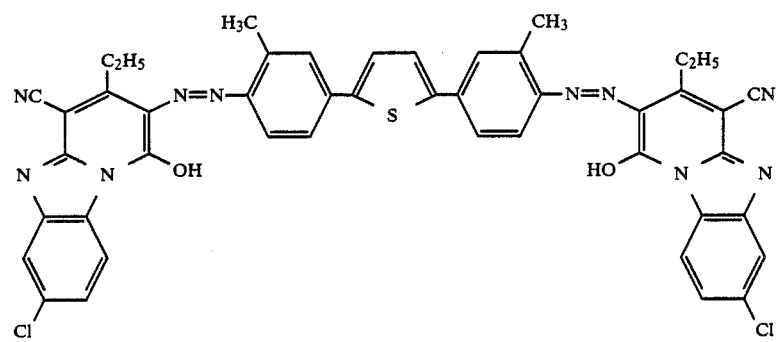 | No. I-27 |

-continued

| | Compound |
|---|---|
| (structures) | No. I-28 |
| | No. I-29 |
| | No. I-30 |
| | No. I-31 |
| | No. I-32 |

-continued

| | Compound |
|---|---|
| [structure] | No. I-33 |
| [structure] | No. I-34 |
| [structure] | No. I-35 |

Specific examples of the azo compounds of the general formula (II) includes:

| | Compound |
|---|---|
| [structure] | No. II-1 |
| [structure] | No. II-2 |

-continued

Compound No. II-3

No. II-4

No. II-5

No. II-6

No. II-7

-continued

| | Compound |
|---|---|
| (structure) | No. II-8 |
| (structure) | No. II-9 |
| (structure) | No. II-10 |
| (structure) | No. II-11 |
| (structure) | No. II-12 |

-continued

| | Compound |
|---|---|
| [structure] | No. II-13 |
| [structure] | No. II-14 |
| [structure] | No. II-15 |
| [structure] | No. II-16 |
| [structure] | No. II-17 |
| [structure] | No. II-18 |

-continued
| | Compound |
|---|---|
| 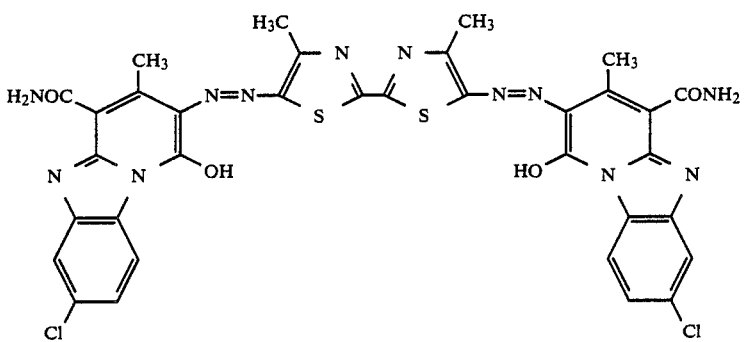 | No. II-19 |
| 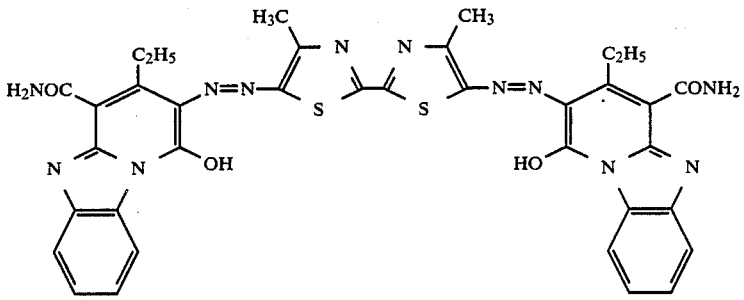 | No. II-20 |
| 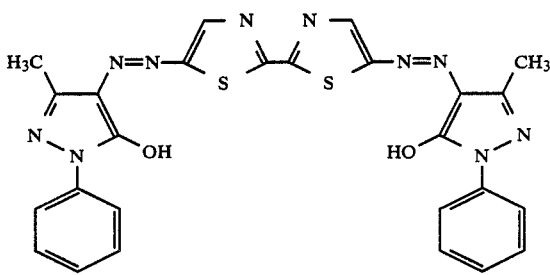 | No. II-21 |
| 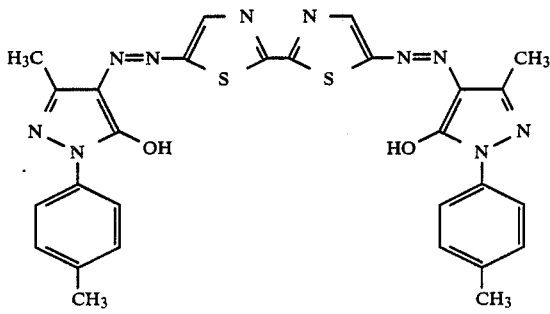 | No. II-22 |
| 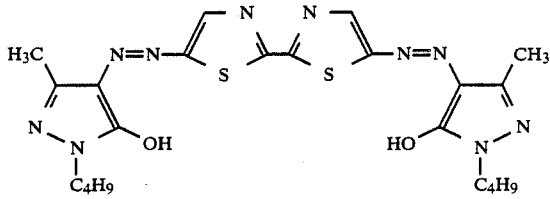 | No. II-23 |

|  | Compound No. II-24 |
|---|---|

|  | No. II-25 |
|---|---|

Specific examples of the azo compounds of the general formula (III) include:

|  | Compound No. III-1 |
|---|---|
|  | III-2 |
|  | III-3 |

-continued

| | Compound No. |
|---|---|
| | III-4 |
| | III-5 |
| | III-6 |
| | III-7 |
| | III-8 |

Compound No.

III-9

III-10

III-11

III-12

III-13

-continued

| | Compound No. |
|---|---|
| | III-14 |
| | III-15 |
| | III-16 |
| | III-17 |
| | III-18 |

-continued
| | Compound No. |
|---|---|
| 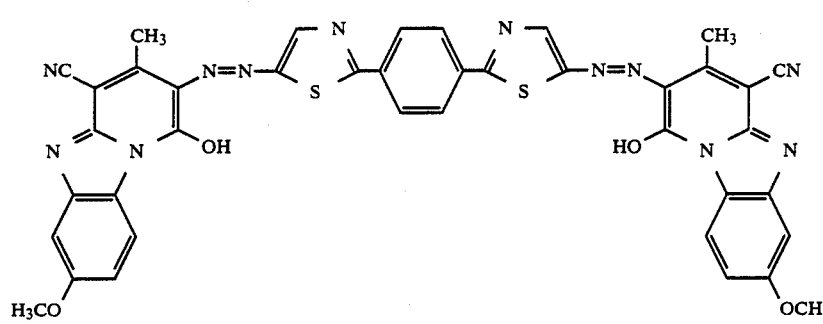 | III-19 |
| 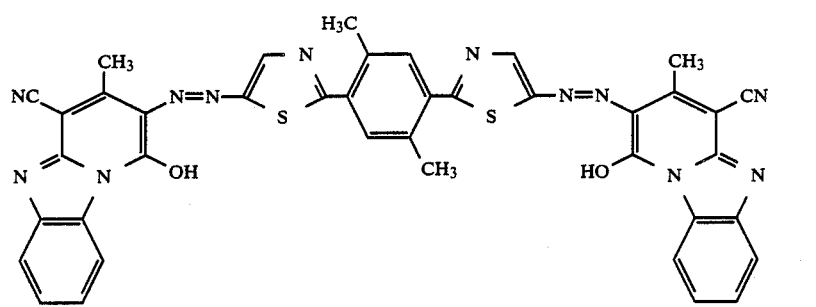 | III-20 |
| 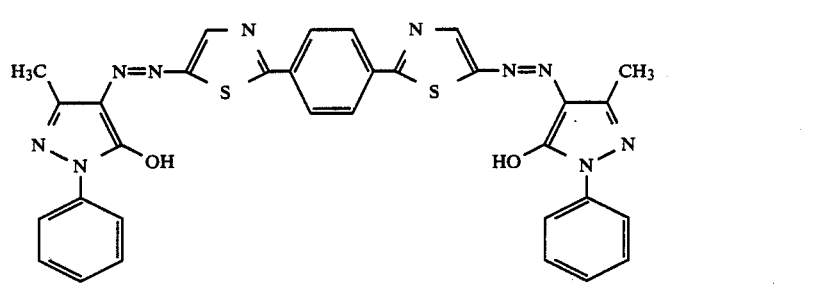 | III-21 |
| 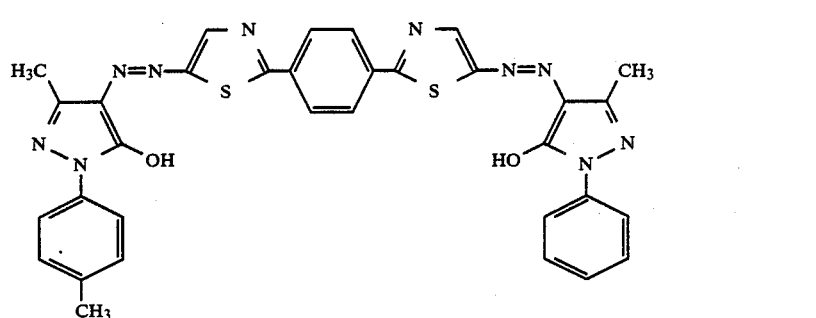 | III-22 |
| 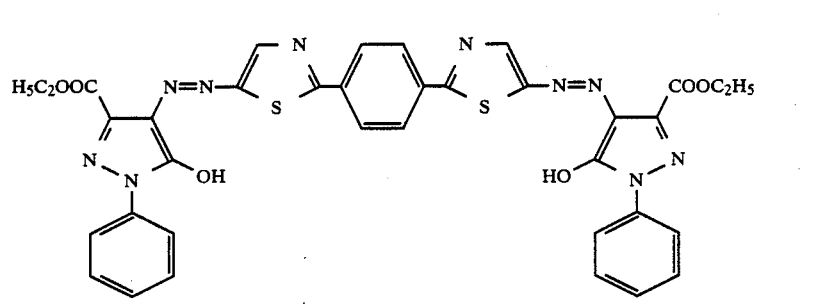 | III-23 |

| Compound No. |
|---|
| III-24 |
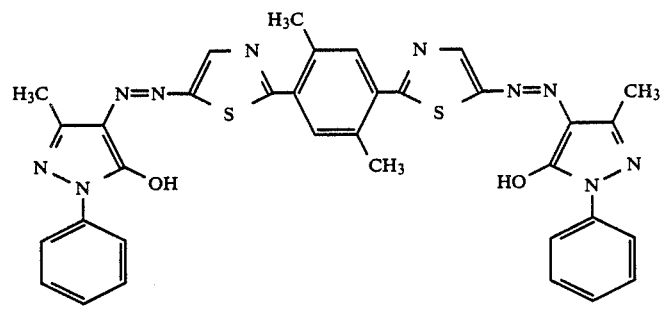
III-25
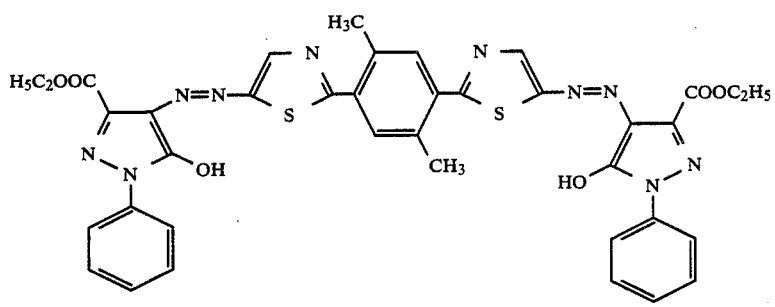
III-26
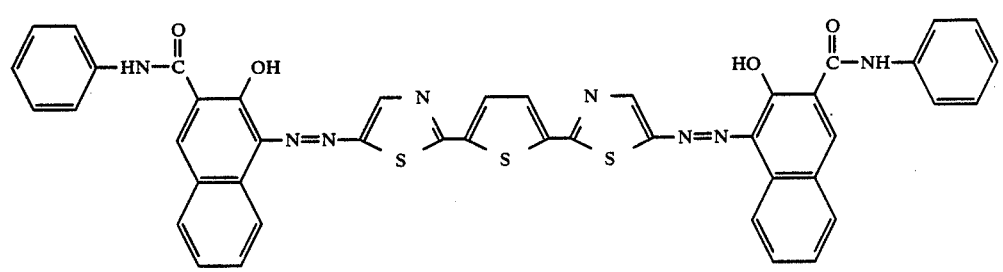
III-27
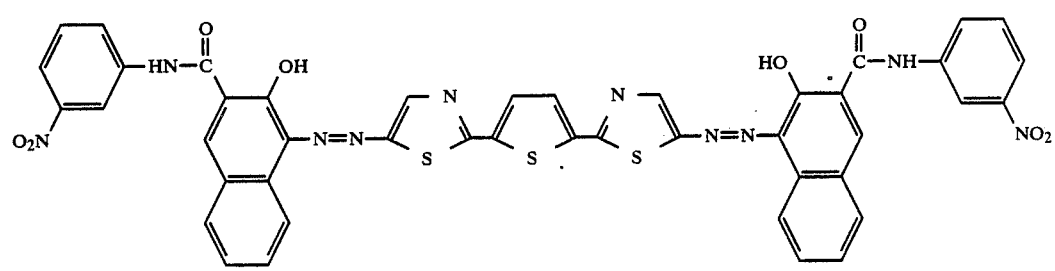
III-28
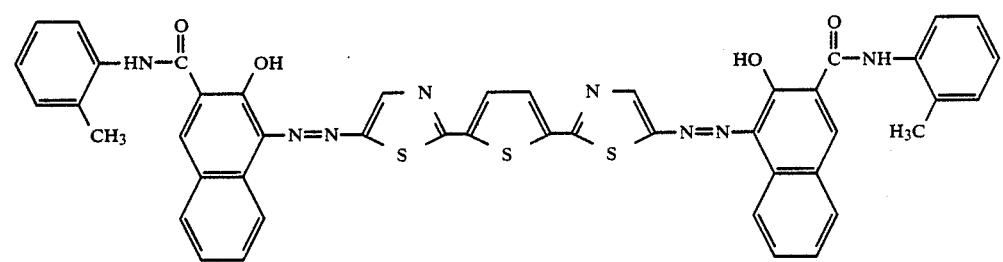

| | Compound No. |
|---|---|
| | III-29 |
| | III-30 |
| | III-31 |
| | III-32 |
| | III-33 |

-continued
Specific examples of the azo compounds of the general formula (IV) include:
| Compound No. |
|---|
| III-34 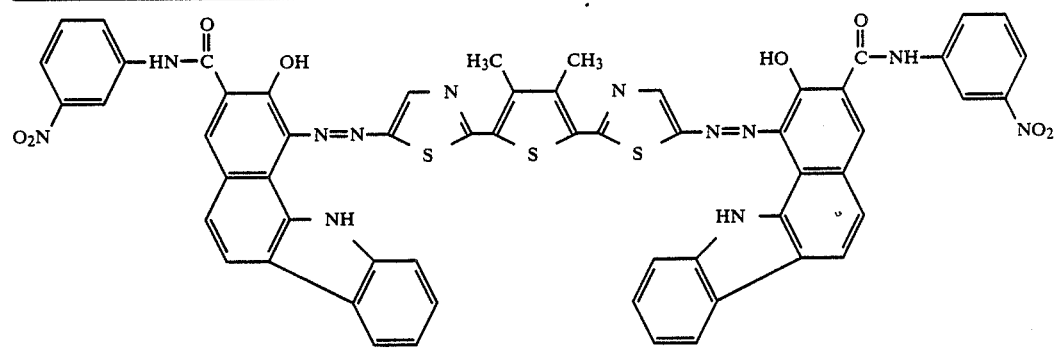 |
| III-35 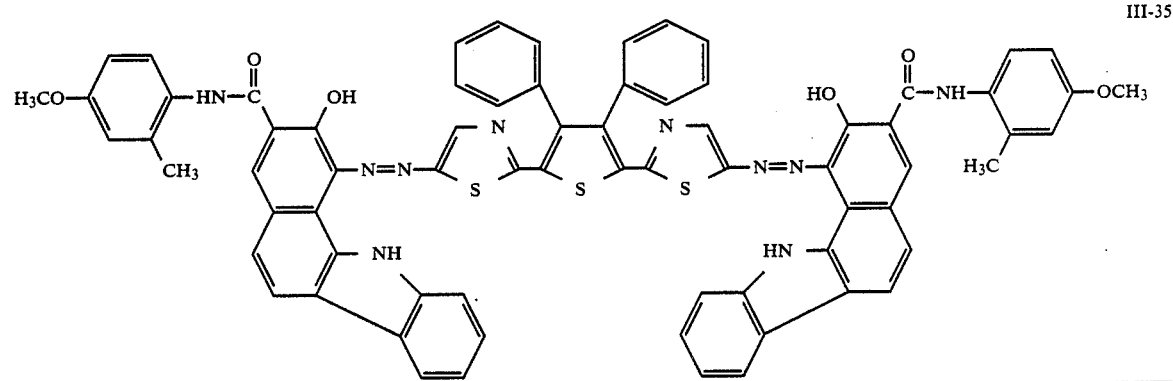 |

| Compound No. | Structure |
|---|---|
| IV-1 | (structure shown) |
| IV-2 | (structure shown) |
| IV-3 | (structure shown) |

-continued
| Compound No. | |
|---|---|
| IV-4 | 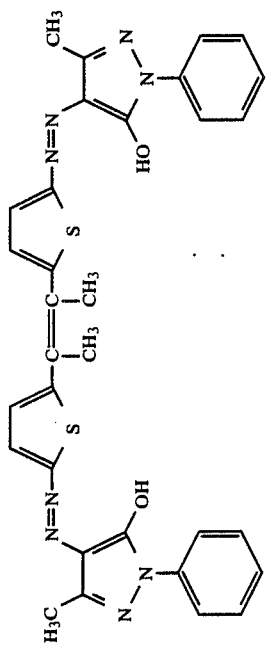 |
| IV-5 | 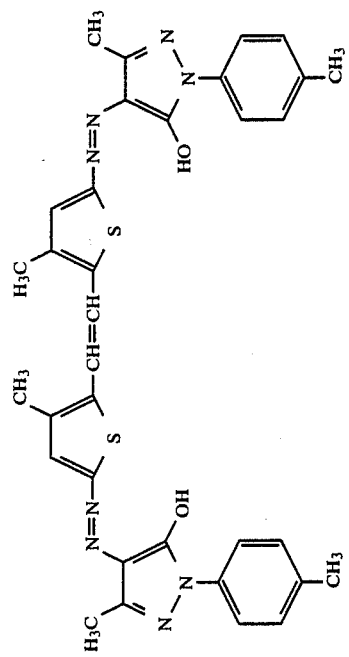 |
| IV-6 | 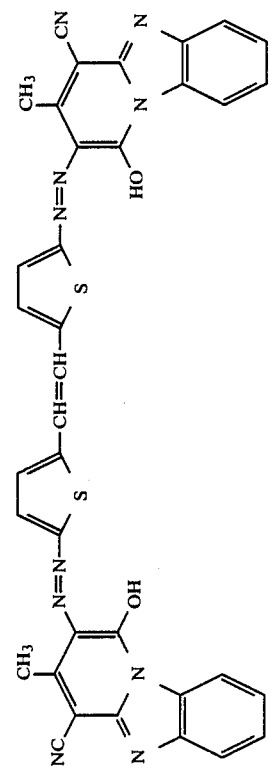 |

-continued

| Compound No. |
|---|
| IV-7 |
| IV-8 |
| IV-9 |

-continued
| Compound No. |
|---|
| IV-10 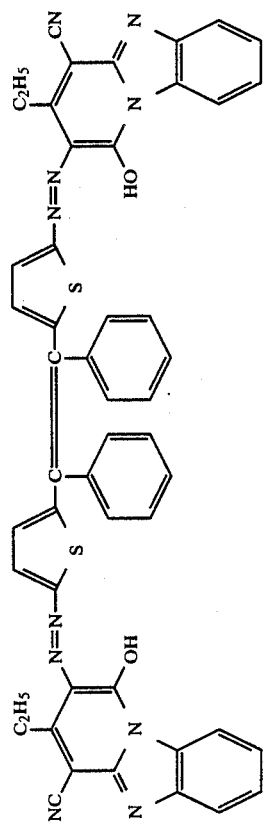 |
| IV-11 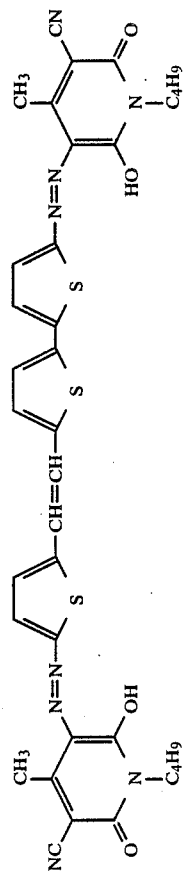 |
| IV-12 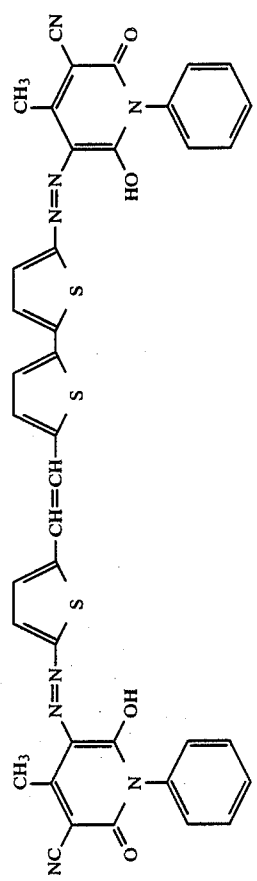 |
| IV-13 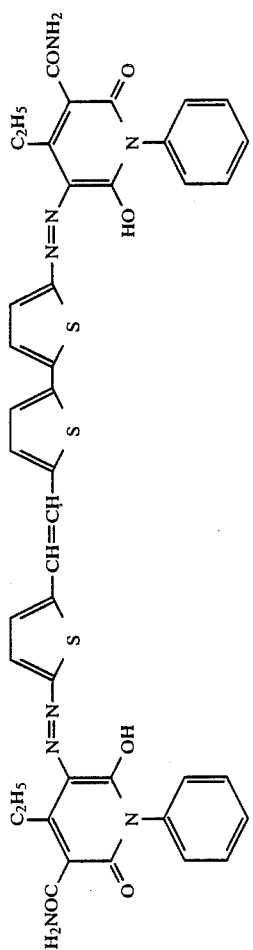 |

-continued
| Compound No. | |
|---|---|
| IV-14 | 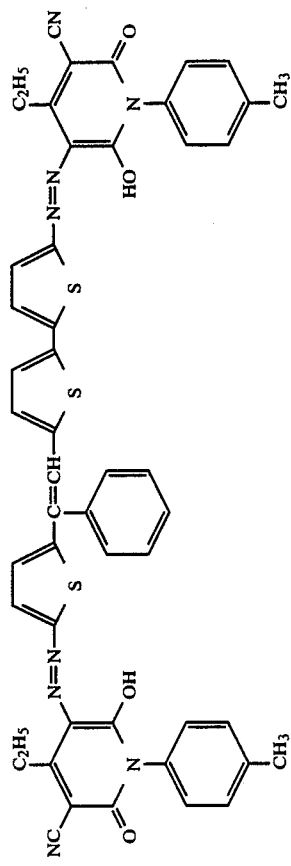 |
| IV-15 | 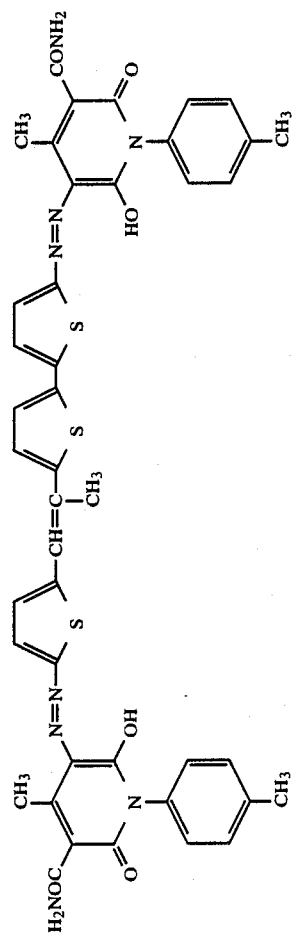 |
| IV-16 | 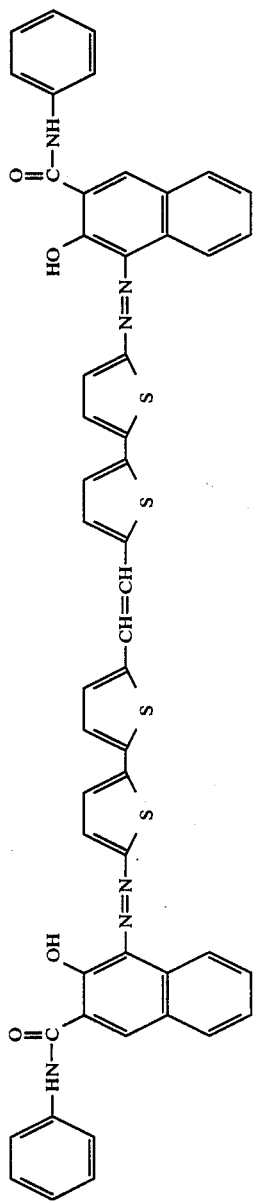 |

-continued
| Compound No. | |
|---|---|
| IV-17 | 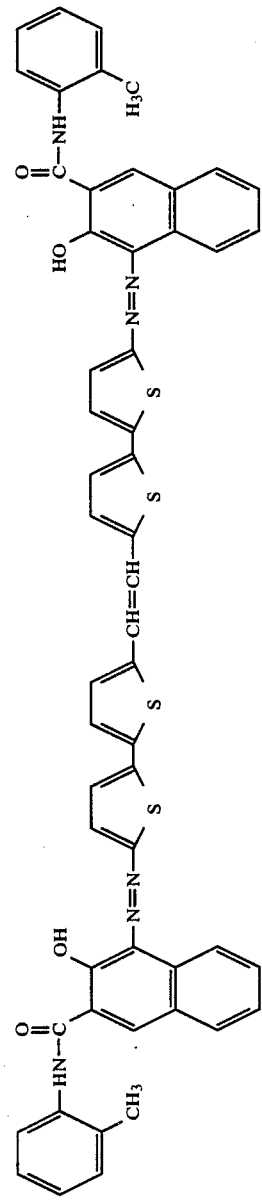 |
| IV-18 | 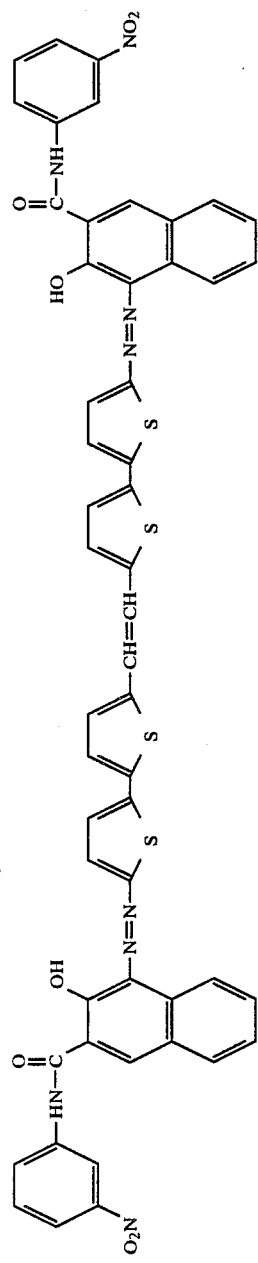 |
| IV-19 | 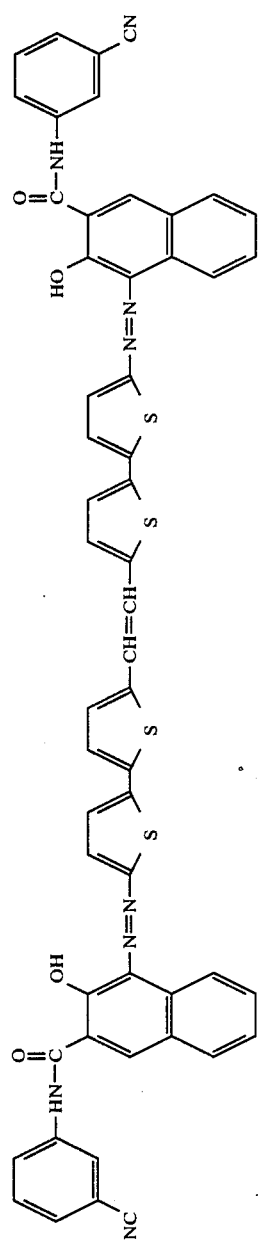 |

-continued
| Compound No. | |
|---|---|
| IV-20 | 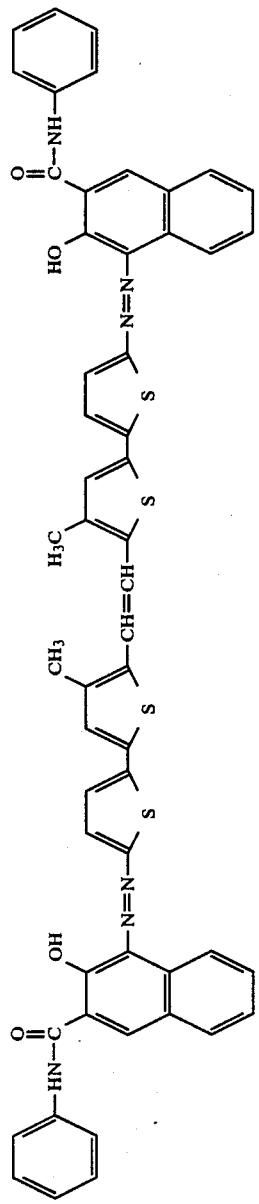 |
| IV-21 | 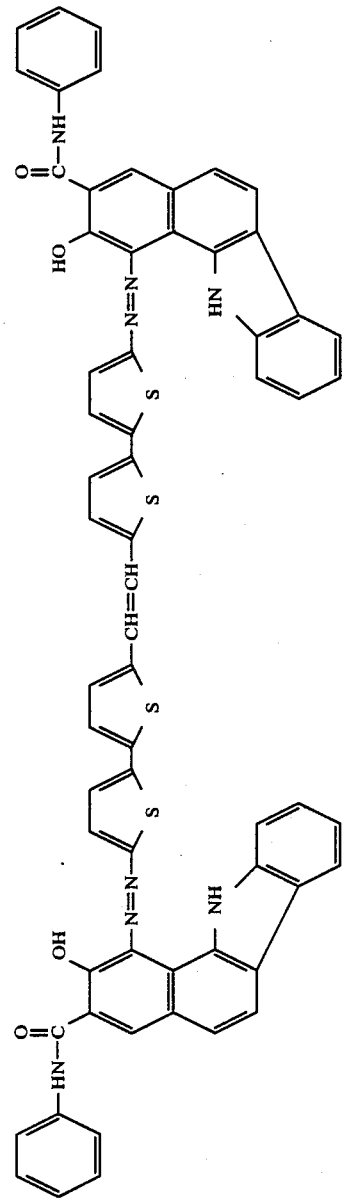 |
| IV-22 | 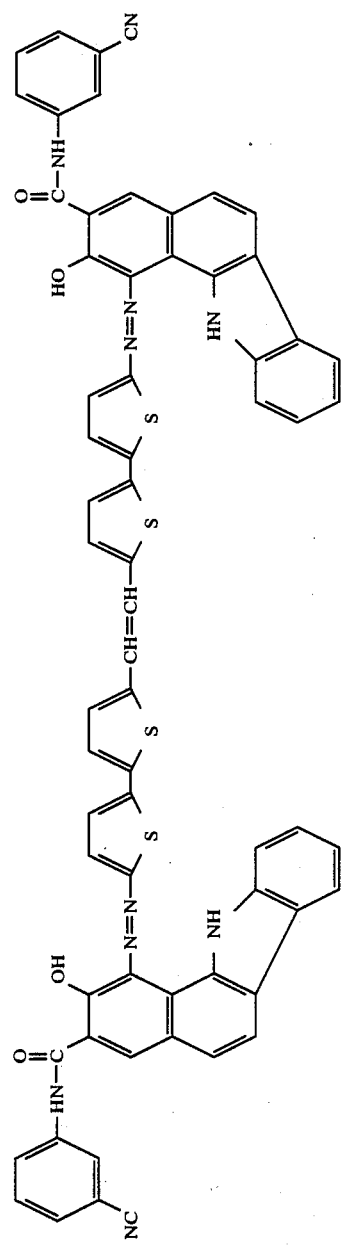 |

| Compound No. |
|---|
| IV-23 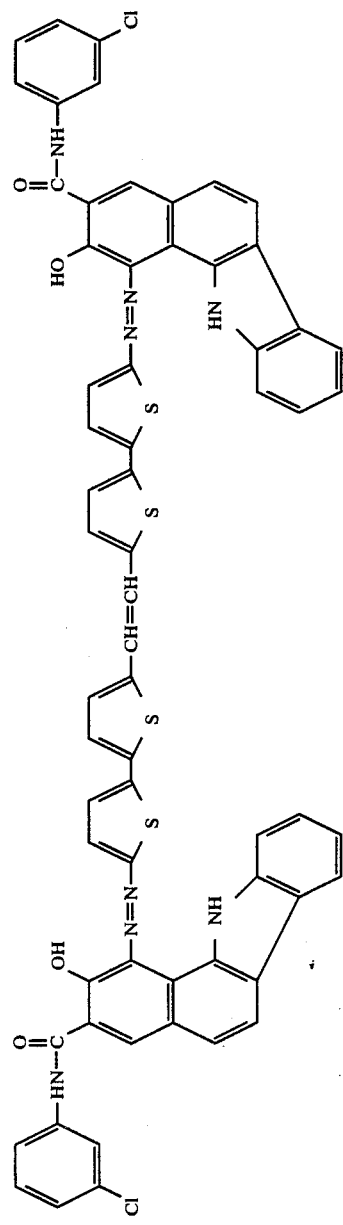 |
| IV-24 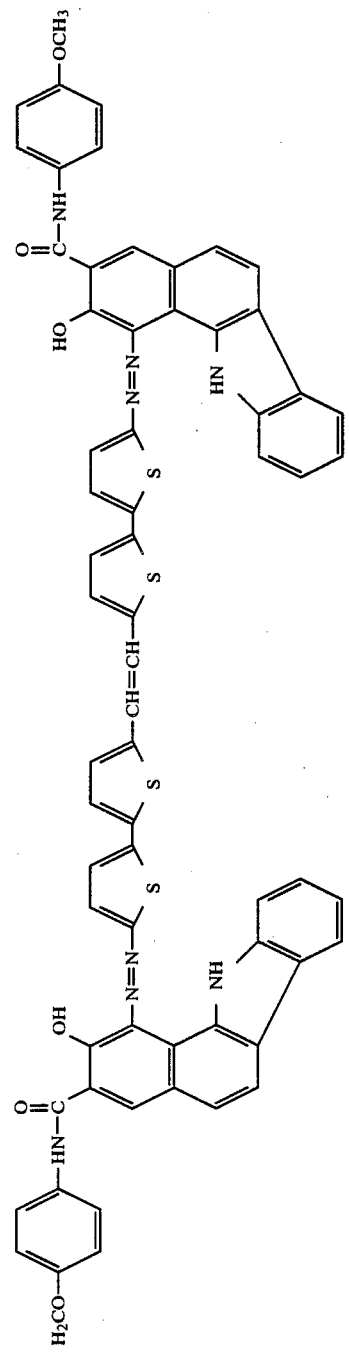 |
| IV-25 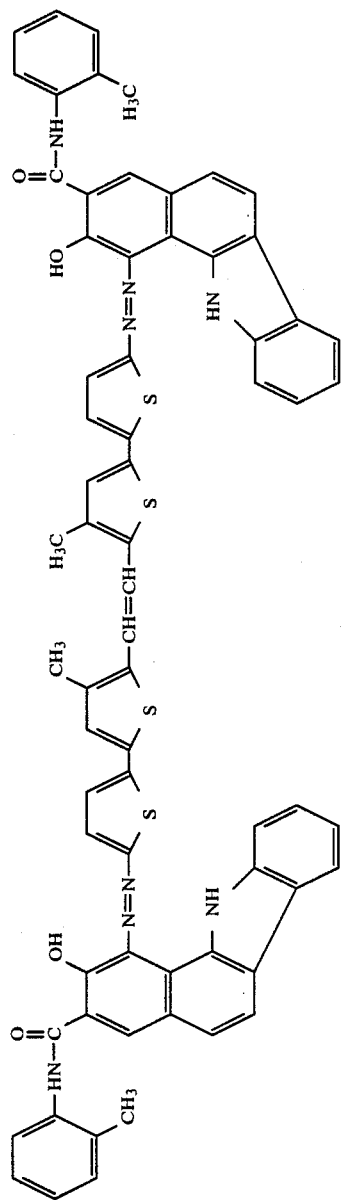 |

The photoconductor of the present invention, which contains the azo compound represented by the above-mentioned general formulae (I), (II), (III) and/or (IV) in the photosensitive layer thereof, may have ane one of the structures as shown in FIGS. 1, 2 and 3 according to the manner of application thereto of the azo compound.

FIGS. 1, 2 and 3 are schematic cross-sectional views of different embodiments of the photoconductor of the present invention, respectively.

FIG. 1 shows a cross-sectional view of a monolayer type photoconductor. A photosensitive layer 2A is provided on an electroconductive substrate 1. The photosensitive layer 2A comprises the above-mentioned azo compound as a charge generating substance 3, and a charge transporting substance 5 both of which substances are dispersed in a resin binder matrix so that the photosensitive layer 2A functions as a photoconductor.

FIG. 2 shows a laminate type photoconductor. A laminated photosensitive layer 2B is provided on an electroconductive substrate 1, a lower layer of the laminate is a charge generating layer 4 including the above-mentioned azo compound as a charge generating substance 3 and an upper one is a charge transporting layer 6 containing a charge transporting substance 5 as a main component, so that the photosensitive layer 2B functions as a photoconductor. This photoconductor is usually used according to the negative charge mode.

FIG. 3 shows another laminate type photoconductor having a layer structure in reverse to that of FIG. 2. A laminated photosensitive layer 2C is provided on an electroconductive substrate 1, a lower layer of the laminate is a charge transporting layer 6 and an upper one is a charge generating layer 4 including the above-mentioned azo compound as a charge generating substance 3. The photosensitive layer also functions as a photoconductor. This photoconductor is usually used according to the positive charge mode. In this case, a covering layer 7 may generally be further provided as shown in FIG. 3 to protect the charge generating layer 4.

Thus, two kinds of layer structure are provided for laminate type photoconductors. The reason for this is that, even if any photoconductor with the layer structure as shown in FIG. 2 is to be used in the positive charge mode, no charge transporting substances adaptable to the positive charge mode have been found yet. Accordingly, when any laminate type photoconductor is to be used in the positive charge mode, the photoconductor is required of a layer structure as shown in FIG. 3 for the present.

A photoconductor as shown in FIG. 1 can be produced by dispersing a charge generating substance in a solution of a charge transporting substance and a resin binder and applying the resulting dispersion on an electroconductive substrate and then drying the resulting coating film.

A photoconductor as shown in FIG. 2 can be prepared by applying and drying a dispersion of a particulate charge generating substance in a solvent and/or a resin binder on an electroconductive substrate, followed by applying a solution of a charge transporting substance and a resin binder on the resulting layer and drying.

A photoconductor as shown in FIG. 3 can be prepared by applying and drying a solution of a charge transporting substance and a resin binder onto an electroconductive substrate, and coating and drying a dispersion of a particulate charge generating substance in a solvent and/or a resin binder onto the resulting coating layer, followed by formation of a covering layer.

The electroconductive substrate 1 serves as an electrode of the photoconductor and as a support for a layers formed thereon. The electroconductive substrate may be in the form of a cylinder, a plate or a film, and may be made of a metallic material such as aluminum, stainless steel or nickel, or other material having a surface treated to be electroconductive, such as glass so treated or a resin so treated.

The charge generating layer 4 is formed by application of a dispersion of an azo compound as a charge generating substance 3 in a resin binder, and this layer generates an electric charge upon receiving light. It is important that the charge generating layer 4 be high not only in charge generating efficiency but also in capability of injecting the generated electric charge into the charge transporting layer 6 and any covering layer 7, which capability is desirably as little dependent upon the electric field as possible and high even in low intensity electric fields. It also is possible to form a charge generating layer using a charge generating substance as a main component in mixture with a charge transporting substance and so on. Resin binders usable in the charge generating layer include polycarbonates, polyesters, polyamides, polyurethanes, epoxy resins, silicone resins, and homopolymers and copolymers of methacrylate esters, which may be used either alone or in appropriate combination.

The charge transporting layer 6, which is formed by application of a solution or dispersion of a hydrazone compound, a pyrazoline compound, a styryl compound, a triphenyl-amine compound, an oxazole compound or an oxadiazole compound as an organic charge transporting substance in a resin binder, exhibits a function of serving as an insulating layer in the dark to retain an electric charge of the photoconductor as well as a function transporting an electric charge injected from the charge generating layer upon receiving light. Resin binders usable in the charge transporting layer include polycarbonates, polyesters, polyamides, polyurethanes, epoxy resins, silicone resins, and homopolymers and copolymers of methacrylate ester.

The covering layer 7 has a function of receiving and retaining an electric charge generated by corona discharge in the dark and a capability of transmitting light to which the charge generating layer should respond. It is necessary that the covering layer 7 transmits light upon exposure of the photoconductor and allows the light to reach the charge generating layer, and then undergoes the injection of an electric charge generated in the charge generating layer to neutralize and erases a surface electric charge. Materials usable in the covering layer include organic insulating film-forming materials such as polyesters and polyamides. Such organic materials may also be used in mixture with an inorganic material such as a glass resin or $SiO_2$, or an electric resistance-lowering material such as a metal or a metallic oxide. Materials usable in the covering layer are not limited to organic insulating film-forming materials, and further include inorganic materials such as $SiO_2$, metals, and metallic oxides, which may be formed on a covering layer by an appropriate method such as vacuum evaporation and deposition, or sputtering. From the viewpoint of the aforementioned description, it is desirable that the material to be used in the covering layer be as transparent as possible in the wavelength range wherein the charge generating substance attains maximum light absorption.

Although the thickness of the covering layer depends on the material or composition thereof, it can be arbitrarily set in so far as it does not produce any adverse effects including an increase in a residual potential in continuous repeated use.

Examples will now be given, wherein various compounds represented by the general formula (I) or (II) were respectively used to produce photoconductors.

EXAMPLE 1

50 parts by weight of the azo compound No. I-1, 100 parts by weight of a polyester resin (Vylon 200, manufactured by Toyobo Co., Ltd.) and 100 parts by weight of 1-phenyl-3-(p-diethylaminostyryl)-5-(p-diethylaminophenyl)-2-pyrazoline (ASPP) are kneaded with tetrahydrofuran (THF) as a solvent with a mixer for 3 hours to prepare a coating liquid. The coating liquid was applied onto an aluminum-deposited polyester film (Al-PET) as an electroconductive substrate by means of the wire bar technique to form a photosensitive layer having a dry thickness of 15 μm. Thus, a photoconductor with the structure shown in FIG. 1 was produced.

EXAMPLES 2-4

Respective examples 2, 3 and 4 of the photoconductor are produced substantially in the same manner as in Example 1 except that the compound Nos. II-1, III-1 and IV-1 are used as the charge generating substance instead of the compound No. I-1.

EXAMPLE 5

First, a solution of 100 parts by weight of p-diethylaminobenzaldehyde-diphenylhydrazone (ABPH) in 700 parts by weight of tetrahydrofuran (THF) was mixed with a solution of 100 parts by weight of polycarbonate resin (Panlite L-1250 manufactured by Teijin Chemicals (Co., Ltd.) in 700 parts by weight of mixed solvent including the same parts of THF and dichloromethane to prepare a coating liquid. The coating liquid was applied onto an aluminum-deposited polyester film substrate by the wire bar technique to form a charge transporting layer having a dry thickness of 15 μm. 50 parts by weight of the compound No. I-1, 50 parts by weight of a polyester resin (Vylon 200), and 50 parts by weight of PMMA were kneaded with a mixer for 3 hours together with THF as a solvent to prepare a coating liquid, which was then applied onto the charge transporting layer by the wire bar technique to form a charge generating layer having a dry thickness of 0.5 μm. Thus, a photoconductor with a structure corresponding to that shown in FIG. 3 was produced. The covering layer, which is not directly related to the present invention was not provided.

EXAMPLES 6-8

Respective examples 6, 7 and 8 of the photoconductor are produced substantially in the same manner as in Example 5 except that the compound Nos. II-1, III-1 and IV-1 are used as the charge generating substance instead of the compound No. I-1.

EXAMPLE 9

A charge transporting layer was formed in substantially the same manner as in Example 5 except that α-phenyl-4'-N,N-dimethylaminostilbene, which is a styryl compound, was used to replace ABPH as a charge transporting substance. Then a charge generating layer was formed on the charge transporting layer, thus a photoconductor was produced.

EXAMPLES 10-12

Respective examples 10, 11 and 12 of the photoconductor are produced substantially in the same manner as in Example 9 except that the compound Nos. II-1, III-1 and IV-1 are used as the charge generating substance instead of the compound No. I-1.

EXAMPLE 13

A charge transporting layer was formed in substantially the same manner as in Example 5 except that tri(p-toryl)amine, which is a triphenylamine compound, was used to replace ABPH as a charge transporting substance. Then a charge generating layer was formed on the charge transporting layer, thus a photoconductor was produced.

EXAMPLES 14-16

Respective examples 14, 15 and 16 of the photoconductor are produced substantially in the same manner as in Example 13 except that the compound Nos. II-1, III-1 and IV-1 are used as the charge generating substance instead of the compound No. I-1.

EXAMPLE 17

A charge transporting layer was formed in substantially the same manner as in Example 5 except that 2,5-bis(p-diethylaminophenyl)-1,3,4-oxadiazole, which is a oxadiazole compound, was used to replace ABPH as a charge transporting substance. Then a charge generating layer was formed on the charge transporting layer, thus a photoconductor was produced.

EXAMPLES 18-20

Respective examples 18, 19 and 20 of the photoconductor are produced substantially in the same manner as in Example 17 except that the compound Nos. II-1, III-1 and IV-1 are used as the charge generating substance instead of the compound No. I-1.

The electrophotographic characteristics of the twenty photoconductors thus produced were measured by utilizing an electrostatic recording paper testing apparatus (Kawaguchi Denki Model SP-428). The result obtained are shown in Table 1.

The surface potential $V_s$ (volts) of each photoconductor is an initial surface potential which was measured when the surface of the photoconductor was positively charged in the dark by corona discharge at +6.0 kV for 10 seconds. After the discontinuation of the corona discharge, the photoconductor was allowed to stand in the dark for 2 seconds, after which the surface potential $V_d$ (volts) of the photoconductor was measured. Subsequently, the surface of the photoconductor was irradiated with white light at an illuminance of 2 luxes and the time (seconds) required for the irradiation to decrease the surface potential of the photoconductor to half of the $V_d$ was measured, then from which the half decay exposure amount $E_{\frac{1}{2}}$ (lux·sec) was calculated. Also, the surface potential of the photoconductor after 10 seconds of irradiation thereof with white light at an illuminance of 2 luxes was measured as a residual potential $V_r$ (volts).

TABLE 1

| Example | $V_s$ (Volts) | $V_r$ (Volts) | $E_{\frac{1}{2}}$ (lux.sec) |
|---|---|---|---|
| 1 | 630 | 130 | 5.7 |
| 2 | 645 | 120 | 5.6 |
| 3 | 585 | 130 | 7.1 |
| 4 | 630 | 130 | 6.4 |
| 5 | 645 | 135 | 5.7 |
| 6 | 620 | 125 | 6.5 |
| 7 | 600 | 135 | 7.9 |
| 8 | 650 | 120 | 5.5 |
| 9 | 655 | 130 | 7.9 |
| 10 | 605 | 120 | 6.2 |
| 11 | 575 | 140 | 7.8 |
| 12 | 615 | 135 | 7.2 |
| 13 | 640 | 135 | 5.9 |
| 14 | 635 | 130 | 7.0 |
| 15 | 595 | 125 | 6.1 |
| 16 | 650 | 120 | 5.6 |
| 17 | 670 | 115 | 6.0 |
| 18 | 640 | 140 | 6.9 |
| 19 | 580 | 120 | 6.0 |
| 20 | 625 | 115 | 6.0 |

As can be seen in Table 1, the photoconductors of Examples 1 to 20 have good characteristics in the surface potentials Vs, the half decay exposure amounts $E_{\frac{1}{2}}$ and the residual potentials Vr.

EXAMPLE 21

100 parts by weight of each of respective azo compounds Nos. from I-2 to I-35, II-2 to II-25, III-2 to III-35 and IV-2 to IV-25 and 100 parts by weight of polyester resin (Vylon 200) were kneaded with THF as a solvent with a mixer for 3 hours to prepare a coating liquid. The respective coating liquids were applied onto aluminum substrates to form a charge generating layer having a dry thickness of about 0.5 μm. Further, the coating liquid prepared in substantially the same manner as in Example 5, except that the ASPP was used as a charge transporting substance instead of ABPH, was applied on the respective charge generating layer having a thickness of about 15 μm, thus photoconductors were produced.

The electrophotographic characteristics of the photoconductors thus produced were measured by utilizing an electrostatic recording paper testing apparatus SP-428. The results of the measurements are shown in Table 2.

TABLE 2

| Compound No. | $E_{\frac{1}{2}}$ (lux.sec) | Vr (volt) |
|---|---|---|
| I - 2 | 6.4 | −115 |
| I - 3 | 5.4 | −150 |
| I - 4 | 6.1 | −130 |
| I - 5 | 7.4 | −110 |
| I - 6 | 7.7 | −145 |
| I - 7 | 5.3 | −115 |
| I - 8 | 5.8 | −110 |
| I - 9 | 6.2 | −110 |
| I - 10 | 7.3 | −125 |
| I - 11 | 7.3 | −120 |
| I - 12 | 6.0 | −150 |
| I - 13 | 7.8 | −135 |
| I - 14 | 5.9 | −115 |
| I - 15 | 8.1 | −115 |
| I - 16 | 6.2 | −120 |
| I - 17 | 6.6 | −125 |
| I - 18 | 7.5 | −145 |
| I - 19 | 6.5 | −145 |
| I - 20 | 7.7 | −135 |
| I - 21 | 7.5 | −140 |
| I - 22 | 6.9 | −145 |
| I - 23 | 8.1 | −115 |
| I - 24 | 7.4 | −160 |
| I - 25 | 5.3 | −130 |
| I - 26 | 7.5 | −115 |
| I - 27 | 6.7 | −140 |
| I - 28 | 7.3 | −135 |
| I - 29 | 5.5 | −130 |
| I - 30 | 7.8 | −145 |
| I - 31 | 6.7 | −135 |
| I - 32 | 6.9 | −120 |
| I - 33 | 5.0 | −120 |
| I - 34 | 7.2 | −130 |
| I - 35 | 6.5 | −115 |
| II - 2 | 4.5 | −125 |
| II - 3 | 6.9 | −133 |
| II - 4 | 7.2 | −145 |
| II - 5 | 7.0 | −130 |
| II - 6 | 5.9 | −140 |
| II - 7 | 5.9 | −125 |
| II - 8 | 7.8 | −145 |
| II - 9 | 7.0 | −105 |
| II - 10 | 7.1 | −110 |
| II - 11 | 5.5 | −130 |
| II - 12 | 6.6 | −130 |
| II - 13 | 6.3 | −120 |
| II - 14 | 8.4 | −125 |
| II - 15 | 8.3 | −130 |
| II - 16 | 6.7 | −140 |
| II - 17 | 7.5 | −130 |
| II - 18 | 8.2 | −140 |
| II - 19 | 6.3 | −125 |
| II - 20 | 7.8 | −125 |
| II - 21 | 5.6 | −145 |
| II - 22 | 5.2 | −105 |
| II - 23 | 7.4 | −140 |
| II - 24 | 8.2 | −150 |
| II - 25 | 7.8 | −145 |
| III - 2 | 5.4 | −130 |
| III - 3 | 5.9 | −120 |
| III - 4 | 5.9 | −130 |
| III - 5 | 6.1 | −145 |
| III - 6 | 5.2 | −135 |
| III - 7 | 5.1 | −145 |
| III - 8 | 6.6 | −125 |
| III - 9 | 7.8 | −120 |
| III - 10 | 7.0 | −135 |
| III - 11 | 6.4 | −125 |
| III - 12 | 7.4 | −125 |
| III - 13 | 5.6 | −120 |
| III - 14 | 5.5 | −115 |
| III - 15 | 5.8 | −120 |
| III - 16 | 6.0 | −125 |
| III - 17 | 5.9 | −130 |
| III - 18 | 5.3 | −120 |
| III - 19 | 6.0 | −135 |
| III - 20 | 6.1 | −130 |
| III - 21 | 5.8 | −115 |
| III - 22 | 6.7 | −140 |
| III - 23 | 6.3 | −120 |
| III - 24 | 7.2 | −110 |
| III - 25 | 6.2 | −125 |
| III - 26 | 7.8 | −115 |
| III - 27 | 6.9 | −145 |
| III - 28 | 7.5 | −120 |
| III - 29 | 6.1 | −130 |
| III - 30 | 5.3 | −135 |
| III - 31 | 7.4 | −140 |
| III - 32 | 5.9 | −145 |
| III - 33 | 7.3 | −140 |
| III - 34 | 8.0 | −135 |
| III - 35 | 6.7 | −130 |
| IV - 2 | 7.2 | −144 |
| IV - 3 | 5.2 | −150 |
| IV - 4 | 6.0 | −120 |
| IV - 5 | 5.3 | −130 |
| IV - 6 | 5.8 | −145 |
| IV - 7 | 7.2 | −115 |
| IV - 8 | 6.5 | −150 |
| IV - 9 | 6.5 | −125 |
| IV - 10 | 5.7 | −110 |
| IV - 11 | 7.8 | −130 |

TABLE 2-continued

| Compound No. | E½ (lux.sec) | Vr (volt) |
| --- | --- | --- |
| IV - 12 | 5.6 | −130 |
| IV - 13 | 6.5 | −130 |
| IV - 14 | 7.7 | −145 |
| IV - 15 | 6.3 | −135 |
| IV - 16 | 6.8 | −130 |
| IV - 17 | 5.3 | −150 |
| IV - 18 | 6.6 | −125 |
| IV - 19 | 5.5 | −130 |
| IV - 20 | 7.4 | −115 |
| IV - 21 | 5.5 | −120 |
| IV - 22 | 6.2 | −125 |
| IV - 23 | 7.3 | −140 |
| IV - 24 | 7.6 | −130 |
| IV - 25 | 7.3 | −120 |

As described above, according to the present invention, since an azo compound represented by any one of the aforementioned chemical formulae is used in a photosensitive layer formed on an electroconductive substrate, as a charge generating substance, a photoconductor shows a high sensitive and excellent characteristics in repeated use when adapted to either a positive charge mode or a negative charge mode. If necessary, a covering layer may be provided on the surface of a photoconductor to improve the durability thereof.

The invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A photoconductor for electrophotography comprising:
   a substrate; and
   a photosensitive layer formed on said substrate and including at least one azo compound represented by the following general formulae (I), (II), (III) and/or (IV) as a charge generating substance:

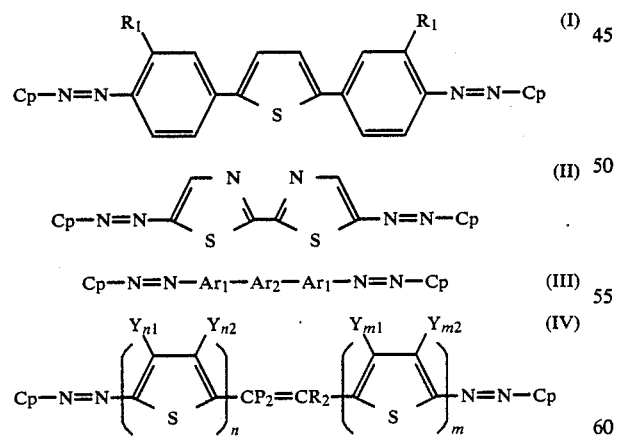

wherein, each of Cp stands for a coupler residual group; in the general formula (I), $R_1$ stands for one of a hydrogen atom, a lower alkyl group, a lower alkoxy group and carbamoyl group; in the general formula (III), $Ar_1$ stands for one of a thienylene group and a thiazolylene group, each of which may be or not may be substituted, $Ar_2$ stands for one of a phenylen group and a thienylen group, each of which may be or not may be substituted ($Ar_1$ and $Ar_2$ do not stand for a thienylene group at the same time); in the general formula (IV), $R_2$ stands for one of a hydrogen atom, a lower alkyl group and a phenyl group which may be or not may be substituted, each of $Y_{n1}$, $Y_{n2}$, $Y_{m1}$ and $Y_{m2}$ stands for one of a hydrogen atom, a lower alkyl group, lower alkoxy group and the following groups, an aromatic hydrocarbon group and aromatic heterocyclic group, both of which may be or not may be substituted and each of n and m stands for one integer of 1, 2 and 3.

2. A photoconductor for electrophotography as claimed in claim 1, wherein said coupler residual group has one of the structure represented by the following general formulae (V), (VI), (VII) and (VIII):

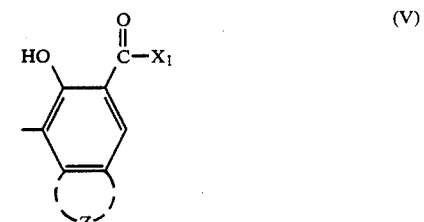

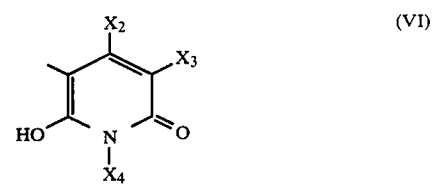

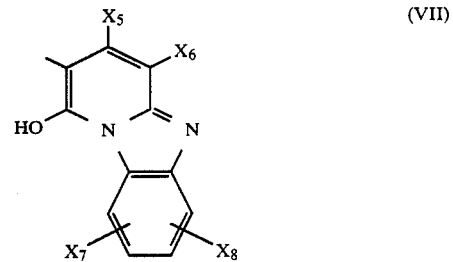

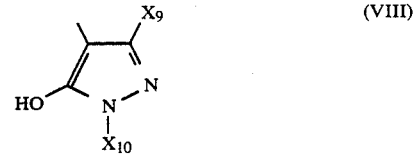

wherein, Z stands for a residual group which forms a polycyclic aromatic ring or an aromatic heterocyclic ring by condensation with a benzene ring; $X_1$ stands for an $OR_3$ or an $NR_4R_5$ (each of $R_3$, $R_4$ and $R_5$ stands for one of a hydrogen atom, an alkyl group, an aryl group and an aromatic heterocyclic group, each of which groups may be or not may be substituted); each of $X_2$ and $X_5$ stands for one of an alkyl group, an aryl group and a aromatic heterocyclic group each of which may be or not may be substituted, each of $X_3$ and $X_6$ stands for one of a hydrogen atom, a cyano group, a carbamoyl group, a carboxyl group, an ester group and an acyl group, $X_4$ stands for one of a hydrogen atom, an alkyl group, a cycloalkyl group, an alkenyl group, an aryl group and an aromatic heterocyclic group, each of which groups may be or not may be substituted, each of $X_7$ and $X_8$ stands for one of a hydrogen atom, a holgen atom, a nitro group and the following groups, an alkyl group and an alkoxy group, both of which may be or not may be substituted, $X_9$ stands for one of an alkyl group, an aryl group, a carboxyl group and an ester group and $X_{10}$ stands for one of an aryl group and an aromatic heterocyclic group, both of which may be or not may be substituted.

3. A photoconductor as claimed in claim 1, wherein said photoconductor comprises a layer including dispersion of a charge generating substance selected from azo compounds represented by the general formula (I), (II), (III) and/or (IV) and a charge transporting substance.

4. A photoconductor as claimed in claim 1, wherein said photoconductor comprises a laminate of a charge transporting layer mainly composed of a charge transporting substance and a charge generating layer including a compound selected from azo compounds represented by the general formula (I), (II), (III) and/or (IV).

* * * * *